INVENTOR
ABRAHAM KEDEM
BY *Gordon Needleman*
ATT'Y.

ated Jan. 17, 1967

3,298,074
ROD CLAMP AND TOOL UTILIZING SAME
Abraham Kedem, 19 Recho Yaakov, Rehovot, Israel
Original application June 4, 1963, Ser. No. 285,382, now Patent No. 3,230,595, dated Jan. 25, 1966. Divided and this application Nov. 9, 1965, Ser. No. 529,614
3 Claims. (Cl. 24—257)

This application is a division of Serial Number 285,382 filed June 4, 1963 and now Patent No. 3,230,595 issued January 25, 1966.

The present invention relates to a device for gripping or clamping rods, wires, or other forms of similarly-shaped members, and to tools and the like utilizing same. It is herein described with respect to several embodiments of devices for gripping and releasing rod-shaped members for use in many diverse applications.

Probably the most common form of rod clamps presently being used is one which includes a screw threaded in a supporting member into engagement with the rod to be clamped. These forms of clamps, however, engage the rod at points, and not surfaces, and therefore tend to subject the engaged points of the rod to substantial wear. Moreover, the clamping action at a point is considerably less than it would be if a greater area of the rod's surface were subjected to the gripping or clamping contact. Further, these clamps are frequently inconvenient to manipulate, particularly when the rod being clamped is of very small size.

An object of the present invention is to provide a novel clamping or gripping device for rod-shaped members and the like which has improved characteristics and properties in one or more of the respects discussed above.

A further object of the invention is to provide a tool having moveable parts which may be clamped or released by the novel clamp.

Several embodiments of the invention are illustrated by way of example in the attached drawings, in which.

Figure 1:
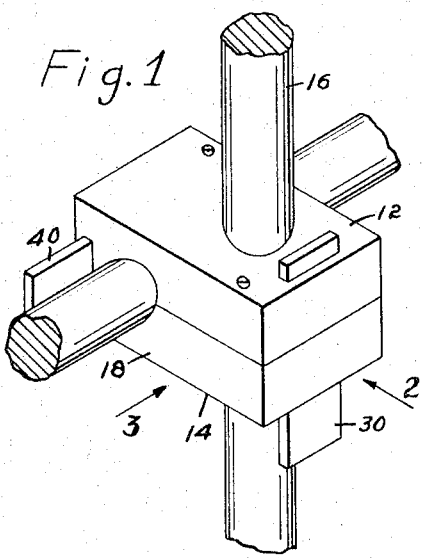
FIG. 1 is a perspective view of a clamp constructed in accordance with the invention for clamping two rods at right angles to each other.
Figure 2:
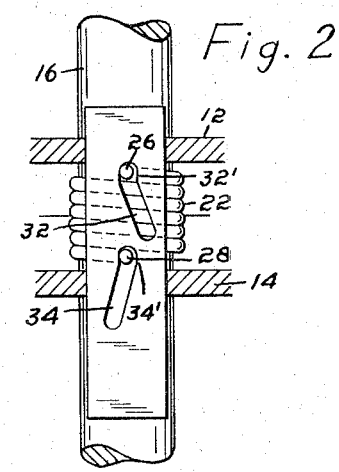
FIG. 2 is a partial sectional view of the clamp of FIG. 1 taken in the direction of arrow 2.
Figure 3:
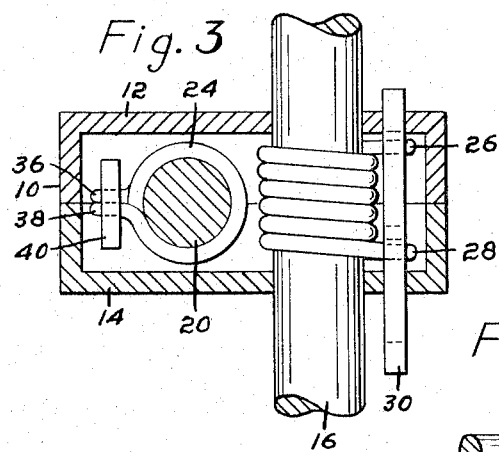
FIG. 3 is another partial sectional view of the clamp of FIG. 1 taken in the direction of arrow 3.

One form of clamp constructed in accordance with the invention is illustrated in FIGS. 1–3, this clamp being particularly designed for gripping and releasing a pair of rod-shaped members at right angles to each other.

The clamp comprises a housing 10 having a pair of aligned openings extending through the top and bottom walls, 12 and 14 respectively, adapted to receive one of the rod-shaped members 16. Housing 10 is further formed with a second pair of openings extending through side walls 18 adapted to receive the second rod-shaped member 20 at right angles to the first member 16. The housing contains a pair of clamping structures, one for each member 16 and 20, which enable the members to be moved to a predetermined position and then clamped in that position.

The clamping structures are best shown in FIGS. 2 and 3, wherein it is seen that a coiled spring 22 is disposed in housing 20 in alignment with the openings in the housing adapted to receive rod 16, and a second coiled spring 24 is disposed in the housing in alignment with the openings therein adapted to receive the second member 20. With reference to coiled spring 22, it is seen that this coiled spring is formed with an upstanding projection 26 at one end and a second upstanding projection 28 at the opposite end. These projections are formed by turning out the two ends of the spring. Housing 10 is formed with an opening which receives a locking plate 30. This latter opening it aligned with the opening receiving rod 16, but is spaced slightly therefrom.

Locking plate 30 is moveable from a first position which causes coiled spring 22 to grip the rod 16, to a second position which causes the coiled spring to release the rod. For this purpose, locking plate 30 is formed with a pair of slots 32 and 34, each of which engages one of the upstanding projections 26 and 28 of coiled spring 22. Slots 32 and 34 are formed so that their major portions lie at an angle to the longitudinal axis of coiled spring 22, but each terminates in a portion, identified as 32' and 34' respectively, which is substantially parallel to the longitudinal axis of the coiled spring.

The arrangement is such that when the locking plate is moved to its first position, which is the position illustrated in FIG. 2 wherein projections 26 and 28 lie in portions 32' and 34' of the slots, it displaces the projections relative to each other in the direction where the coiled spring tends to wind tighter. This, in effect, reduces the internal diameter of the coiled spring and therefore causes the latter to firmly grip the rod member 16 disposed therein. When it is desired to release the rod member, locking plate 30 is moved in the opposite direction (i.e. upwardly in the view of FIG. 2), which causes projections 26 and 28 to be displaced in the direction tending to unwind the coiled spring. This, in effect, enlarges the internal diameter of the coiled spring and thereby releases rod 16 therefrom.

The second clamping mechanism disposed in housing 10 is of the same construction and operates in the same manner, the corresponding parts which cooperate with the second rod 20 being identified in the drawings, particularly FIG. 3, by the reference numerals 24 for the coiled spring, 36 and 38 for its two upstanding projections, and 40 for the locking plate.

The clamp illustrated in FIGS. 1–3 is of simple construction and is conveniently operated to clamp and release the rods. All that is necessary is to move the locking plates 30 or 40 in one position to release the respective clamp, which permits the respective rods 16 and 20 to be moved to any desired position, and then to return the locking plates to their original position to cause the spring to grip firmly the rods. Portions 32' and 34' in the slots (FIG. 2) are formed substantially parallel to the longitudinal axis of the coiled spring so as to assure that when the locking plate is moved to its clamping position, there will be no tendency by the resiliency of the spring to cause the locking plate to return.

Figure 4:
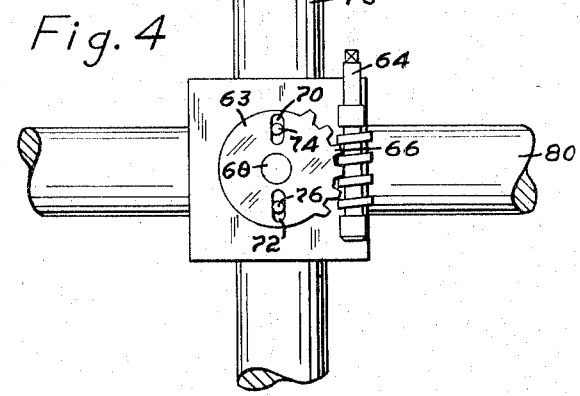
FIG. 4 is a side elevational view of another embodiment of clamp constructed in accordance with the invention.

FIG. 4 illustrates an embodiment of the invention similar to that of FIGS. 1–3 except that here the locking plate is in the form of a rotatable disc 63 which is rotated in one or the other direction by a rack 64 co-operating with pinion teeth 66 formed on a portion of the peripheral surface of disc 63. The latter disc is rotatable on shaft 68. Disc 63 is formed with a pair of slots 70 and 72, comparable to slots 32 and 34 in locking plate 30 of FIGS. 1–3. Slots 70 and 72 receive upstanding projections 74 and 76, which are comparable to projections 26 and 28 in the coiled spring of FIGS. 1–3, the coiled spring not being illustrated in the view of FIG. 5.

The purpose of the arrangement of FIG. 5 is to provide for gripping and releasing rod-shaped member 78 from a remote position, or from a power unit. In either case, rack 64 is rotated in one direction to rotate disc 63 to cause the coiled spring projections 74 and 76 to be displaced to their clamping position, and rotated in the opposite direction to cause coiled spring projections 74 and 76 to be displaced to their releasing position.

The same structure may be found at the opposite side of the mechanism illustrated in FIG. 4 for clamping and releasing the second rod 80.

While the invention has been described with respect to several embodiments thereof, it will be understood that these embodiments are merely illustrative and not limiting. Many changes may be made in the described embodiments, and features of the invention, taken singly or in combination may be applied to other types of devices such as clutches, brakes and the like, without departing from the spirit and scope of the invention as defined in the following claims.

I claim:

1. A device of the character described for gripping and releasing a rod-shaped member, comprising a coiled spring adapted to receive the rod-shaped member therein; said coiled spring being formed with an upstanding projection at each end thereof; and a locking device comprising a disc having radially aligned slots therein for receiving said upstanding projections; said disc being rotatable in a first direction to displace said projections relative to each other to cause said coil to wind and thereby to grip the rod-shaped member therein; said disc being rotatable in the opposite direction to displace said projections relative to each other to cause said coil to unwind and thereby to release the rod-shaped member.

2. A device of the character described for gripping and releasing a rod-shaped member, comprising a coiled spring adapted to receive the rod-shaped member therein; said coiled spring being formed with an upstanding projection at each end thereof; and a locking device comprising a disc having slotted portions therein for receiving said upstanding projections; said disc being rotatable in a first direction to displace said projections relative to each other, in a manner causing substantially the entire length of said coil to firmly grip said rod-shaped member and provide a gripping force substantially in excess of the inherent spring force; said disc being rotatable in the opposite direction to displace said projections relative to each other to cause said coil to unwind and thereby to release the rod-shaped member; and means for maintaining the position of said disc when rotated in said first direction, to thereby maintain the firm gripping relationship of said spring and rod-shaped member.

3. A device as set forth in claim 2, wherein said disc includes peripheral teeth over at least a portion of the circumference thereof; and rack means having teeth in co-operative engagement with said peripheral teeth for rotation of said disc.

References Cited by the Examiner

UNITED STATES PATENTS 1,659,111  2/1928  Lett.

FOREIGN PATENTS 298,671  6/1917  Germany.

WILLIAM FELDMAN, *Primary Examiner.*

DONALD A. GRIFFIN, *Examiner.*